April 19, 1932.  L. A. KOCH, JR  1,854,653
REEL
Filed Oct. 23, 1930
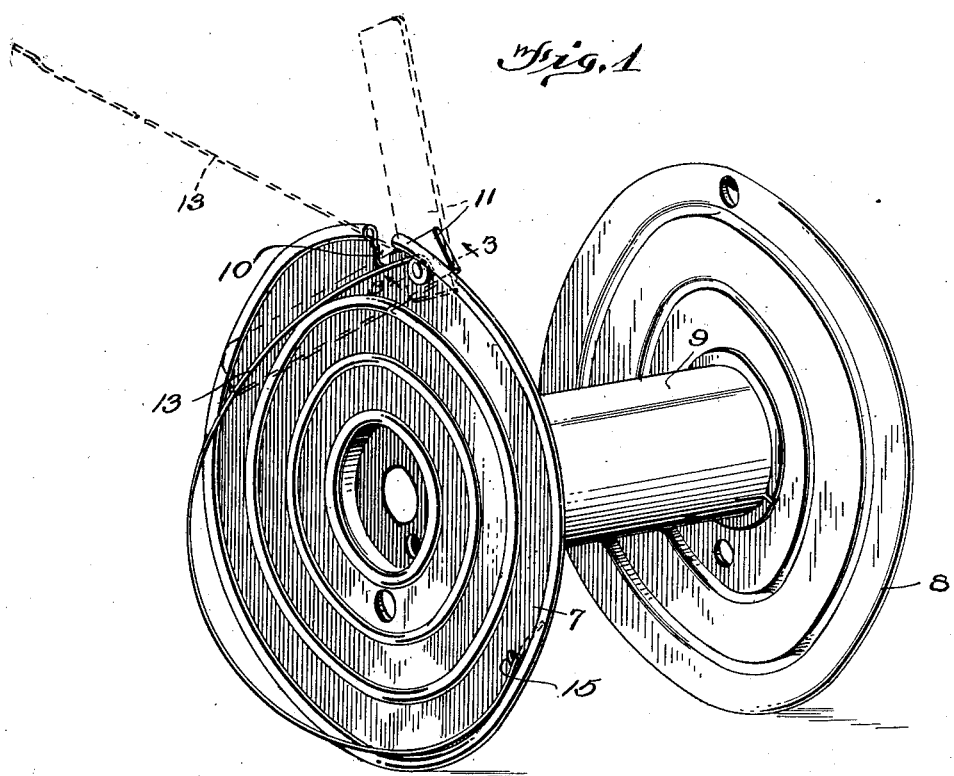
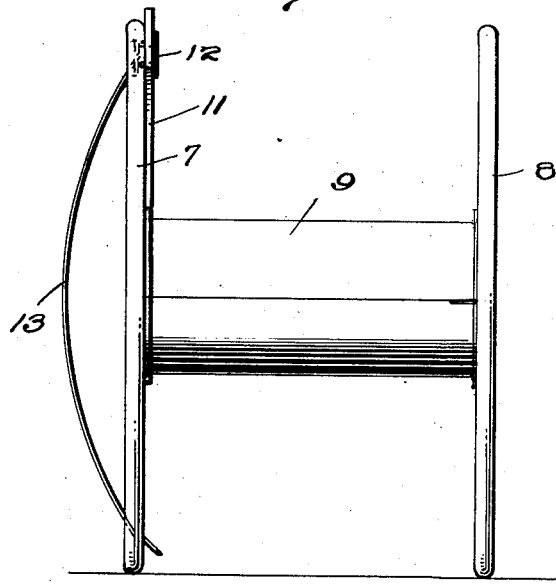
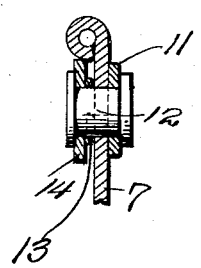
INVENTOR.
Louis A. Koch Jr.
BY
Henry P. Bright
ATTORNEY.

Patented Apr. 19, 1932

1,854,653

UNITED STATES PATENT OFFICE

LOUIS A. KOCH, JR., OF LOUISVILLE, KENTUCKY, ASSIGNOR TO KOCH AUTO ELECTRIC COMPANY, OF LOUISVILLE, KENTUCKY, A CORPORATION OF KENTUCKY

REEL

Application filed October 23, 1930. Serial No. 490,783.

My invention relates to reels and has for its object to provide a cutting attachment secured to the reel by means of which a length of wire or other material can be cut from the remainder on the reel when the desired quantity has been unreeled.

A further object of the invention is to provide a measuring device by means of which the length of the material unwound and cut off can be determined.

These devices are permanently attached to the reel, so that the cutter and measuring device are always close at hand when it becomes necessary to use them.

The device will be found particularly useful in connection with reels for insulated and other wire, but, as will be apparent, may be used for any other material for which it is suited.

One form of the invention is illustrated in the accompanying drawings in which

Figure 1 is a perspective view of the reel with the cutting attachment and measuring device of my invention applied thereto, said attachment and device being shown in one position in full lines and in another position in dotted lines;

Figure 2, an edge elevation of Figure 1; and

Figure 3, a section on the line 3—3 of Figure 1.

As illustrated in the drawings my device may be made of metal or other suitable material, has the usual heads 7 and 8 and a tubular core 9 which is adapted to receive a spindle on which the reel may be mounted.

On the flange or head of the reel is a notch 10 cut in the edge thereof. Movable across this notch is a blade 11, the inner end of which is pivoted to the head adjacent the notch by a headed pin or rivet 12, the pivotal connection being sufficiently loose to permit the knife to be swung in and out across the notch.

The measuring device as shown consists of a piece of spring wire 13, although it may be of any suitable linear material, and this is looped at one end around the pin 12, preferably under a washer 14, so as to attach the measuring device to the head of the drum. The measuring wire will be of standard length, say a foot, and when not in use its free end may be inserted and held in a hole 15, shown in Figure 1, whereby it will be retained in convenient position for use when the occasion arises.

In the use of the device the wire or other material on the reel will be unwound to approximately the length desired. Then it is crossed over through the notch 10 and cut off at the notch by pressing down the knife 11. Either before or after it is cut off it may be measured by loosening the measuring wire 13 from the hollow 15, then drawing the material along the measuring wire to indicate its approximate length as above referred to.

The device with the attachments described will obviate the necessity of the salesman carrying a cutter and measuring instrument to the reel when making a sale of material therefrom. The cutting and measuring attachments may be provided at very small cost and with resulting great convenience as will be apparent.

It will be noted that the pin or rivet 12 performs the double function of providing a mounting for the blade 11 and also providing the securing means for the measuring wire 13.

I claim:

1. A reel including two heads, one of which is provided with a cutting attachment, and a linear measuring device attached to said head adjacent said cutting device, whereby a length cut by said device may be measured.

2. A reel as set forth in claim 2, the measuring device comprising a length of flexible material.

3. A reel including two heads, one of which is provided with a flexible measuring device attached at one end to said head and free at the other end.

4. A reel including two heads, one of which is provided with a measuring device consisting of a piece of spring wire one end of which is attached to the head and the other end of which is free, the head to which the wire is attached having an opening in which the free end of said wire may be engaged when not in use.

5. A reel including two heads, one of which is provided with a notch opening through its periphery, a pin extending through the head adjacent its notch, a knife on the inner side of the head pivoted on the pin for movement across the notch, and a flexible measuring device secured on the outer side of the head by said pin.

In testimony whereof I hereunto affix my signature.

LOUIS A. KOCH, Jr.